United States Patent [19]

Rumpel et al.

[11] Patent Number: 4,971,379
[45] Date of Patent: Nov. 20, 1990

[54] VEHICLE SEAT LATCH WITH TAKE-UP MECHANISM

[75] Inventors: Harvey R. Rumpel, Plymouth; Kevin S. McLaughlin, Detroit, both of Mich.

[73] Assignee: Hoover Universal, Inc., Ann Arbor, Mich.

[21] Appl. No.: 348,901

[22] Filed: May 8, 1989

[51] Int. Cl.$^5$ .............................................. B60N 1/02
[52] U.S. Cl. .................... 296/63; 248/503.1; 297/336
[58] Field of Search ................... 296/63, 65.1; 248/503.1; 297/336, 344, 335

[56] References Cited

U.S. PATENT DOCUMENTS

| | | | |
|---|---|---|---|
| 4,606,577 | 8/1986 | Hirama et al. | 297/336 X |
| 4,759,580 | 7/1988 | Berklich, Jr. et al. | 296/65.1 |
| 4,770,459 | 9/1988 | Nakaiwa et al. | 297/336 X |
| 4,836,597 | 6/1989 | Izumida | 296/63 |
| 4,838,513 | 6/1989 | Kondo | 248/503.1 |
| 4,865,377 | 9/1989 | Musser et al. | 248/503.1 |

Primary Examiner—Dennis H. Pedder
Attorney, Agent, or Firm—Harness, Dickey & Pierce

[57] ABSTRACT

A vehicle seat latch with a take-up mechanism for use in securing a removable bench seat to a vehicle. The bench seat being supported on laterally spaced pedestals which are engageable with support shafts in the floor structure of a vehicle. The rearward end of the pedestals include an elongated U-shaped slot for engagement with the support shaft, the slots are elongated to accommodate variations in the vertical height of the support shafts in the vehicle floor. The latch take-up mechanism includes a take-up hook which is rotatable underneath the support shaft to engage the lower surface of the support shaft to prevent the bench seat from rocking forward during rapid deceleration of the vehicle.

14 Claims, 4 Drawing Sheets

VEHICLE SEAT LATCH WITH TAKE-UP MECHANISM

BACKGROUND AND SUMMARY OF THE INVENTION

This invention relates to floor latches for mounting removable bench seats to a motor vehicle and in particular to a floor latch having a take-up mechanism to prevent rocking of the seat when mounted in a vehicle.

Modern passenger carrying vans and other multi-purpose passenger vehicles are frequently equipped with bench seats which are removable to permit varied uses of the vehicle. With one or more bench seats installed, the vehicles can be used to carry a number of occupants or the bench seats may be removed to enable the vehicle to transport large objects such as furniture, building materials, etc.

Present motor vehicle safety standards require vehicle bench seats to be equipped with seat belt systems. In the event of a vehicle impact, extreme loads are transferred from the seat belts to the seat structure, and the seat may be further subjected to loads due to occupants or objects striking the seat. As an occupant protection measure, it is desirable to maintain the bench seat securely fastened to the vehicle structure during a collision. Accordingly, the fastening system used to attach the bench seat to the vehicle floor must be capable of transmitting high force loadings. While other fasteners can be used to mount a bench seat to the vehicle floor, most manufactures offer mechanisms which are designed to enable rapid removal and replacement of the seat without requiring the use of tools.

Conventional motor vehicle bench seats have a pair of laterally spaced supporting pedestals. In order to provide acceptable securement of the seat, it is necessary for each of the pedestals to be anchored to the vehicle floor. If the seat is to be easily removable, a latching mechanism is required for each of the pedestals.

One mechanism for attaching the seat to the vehicle floor structure utilizes a pair of longitudinally spaced support shafts for attaching each pedestal. Each pair of support shafts are mounted to the floor in a position extending laterally relative to the vehicle. The pedestal includes at its lower front end, a horizontally directed U-shaped slot which is opened forwardly to enable the pedestal to be mounted on the shaft by positioning the pedestal slot around the support shaft.

The rearward lower edge of the pedestal includes a latch mechanism to secure the pedestal to the rearward support shaft. After the front end of the pedestal is positioned on the front support shaft, the bench seat is rotated about the forward support shaft to lower the rear of the pedestal onto the rearward support shaft. The latch mechanism includes one or more hooks which rotate underneath the rearward support shaft to secure the seat pedestal to the rearward support shaft.

Due to manufacturing tolerances of the vehicle body, the rearward support shafts on opposite sides of the vehicle are not always positioned at the same vertical height. In order to accommodate this variation in the vertical position of the support shafts, the pedestal, at the point of engagement with the rear support shaft, has an inverted elongated U-shaped slot into which the support shaft is positioned. The latch hook is rotated beneath the shaft, closing the slot to entrap the support shaft in the slot between the seat and the latch hook.

The slot enables each pedestal to be secured to the respective rearward support shaft and allow for variation in the shaft vertical position. As a result of the elongated U-slot, there may be a gap between the latch hook and the support shaft. A gap between the shaft and the latch hook will enable the bench seat to rock forward, especially during rapid stopping of the vehicle. This rocking motion and the noise produced by the rocking can be an annoyance to the vehicle occupants.

Accordingly, it is an object of this invention to provide a floor latch with a take-up mechanism to eliminate or reduce the length of the U-slot after the seat is installed to eliminate the rocking motion of a bench seat.

To eliminate the rocking motion during vehicle stopping, the latch of the present invention includes a take-up mechanism employing a hook which pivots about the same pivot point as the latch hook. The take-up hook has a surface which engages the lower side of the support shaft opposite the seat as the take-up hook is rotated to a position beneath the support shaft. The take-up hook is shaped so as to close the gap beneath the support shaft as the take-up hook is rotated beneath the shaft. Once the take-up hook engages the support shaft, the hook rotation is stopped. The take-up hook is held in this position by a spring. With take-up mechanism engaging the bottom side of the support shaft, the bench seat will not rock forward during vehicle breaking.

Further objects, features and advantages of the invention will become apparent from a consideration of the following description and the appended claims when taken in connection with the following drawings.

DETAILED DESCRIPTION OF THE PREFERRED EMBODIMENT

Figure 1:
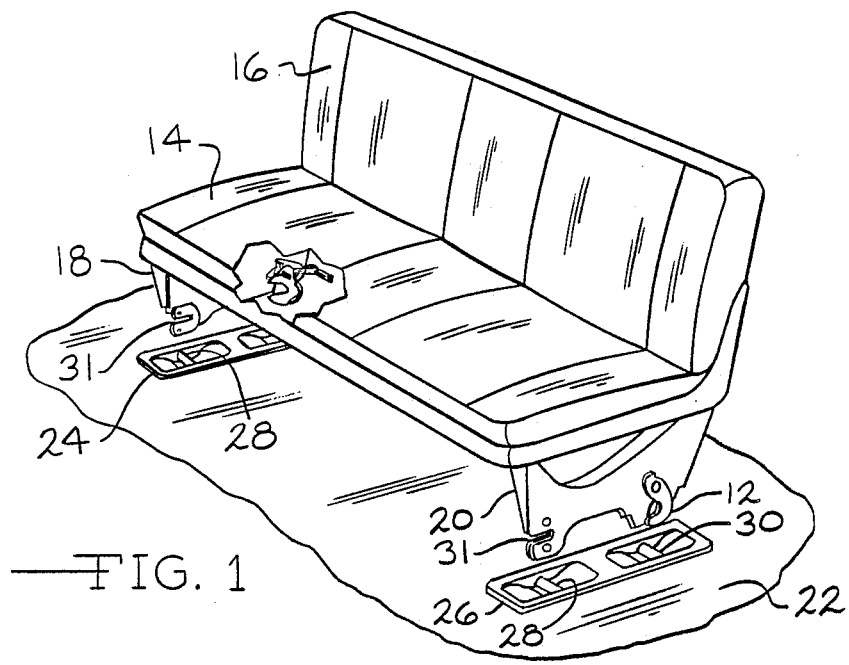
FIG. 1 is a perspective view of a bench seat including the floor latch of this invention shown in a released position from an associated motor vehicle floor.
Figure 2:
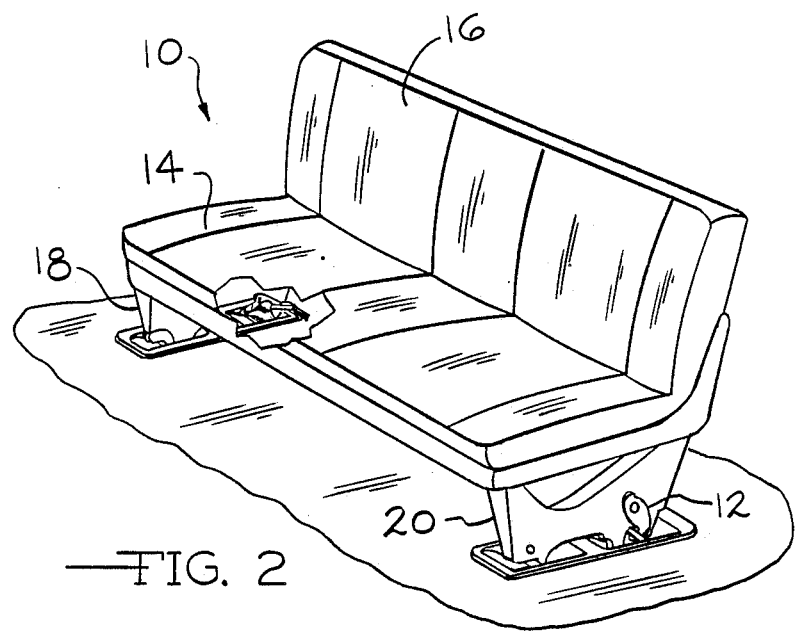
FIG. 2 is a perspective view of the bench seat shown in FIG. 1 in a position secured to the motor vehicle floor.

With reference to the drawing, the bench seat 10, shown in FIGS. 1 and 2, is of a type with which the floor latch 12 of this invention may be used. Seat 10 is of conventional design having a seat cushion portion 14 and a seat back portion 16 and is supported by a pair of laterally spaced pedestals 18 and 20. The seat 10 is removably coupled to vehicle floor 22 which has a pair of laterally separated mounting sockets 24 and 26 which are positioned for engagement with pedestals 18 and 20. FIG. 1 shows the bench seat 10 in a released condition while FIG. 2 shows the bench seat 10 in a secured condition.

Each of the mounting sockets 24 and 26 includes a pair of longitudinally spaced support shafts 28 and 30 which extend laterally with respect to the vehicle. Floor shafts 28 and 30 are preferably positioned below the surface of the floor 22 such that when the bench seat 10 is removed, they are unobtrusive and do not interfere with loading and unloading of the vehicle.

A forwardly opening U-shaped support shaft receiving slot 31 is formed in the forward end of each pedestal. When the seat 10 is installed in the vehicle, the seat 10 is manipulated so as to position the slot 31 around the forward support shafts 28.

Floor latches 12 are provided for each of the pedestals 18 and 20 at their rearward ends which are detachably coupled to the rearward floor shafts 30. After the bench seat 10 has been positioned on the forward support shafts 28, the bench seat is rotated downwardly until the rear of the pedestals engage the rearward floor shafts 30 and are coupled thereto by latches 12.

Figure 3:
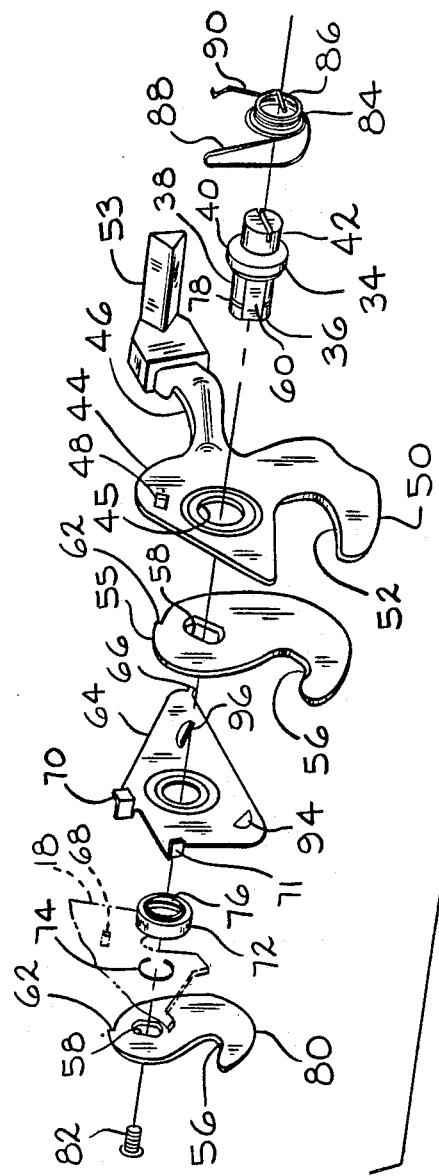
FIG. 3 is an exploded perspective view of the latch of this invention.
Figure 4:
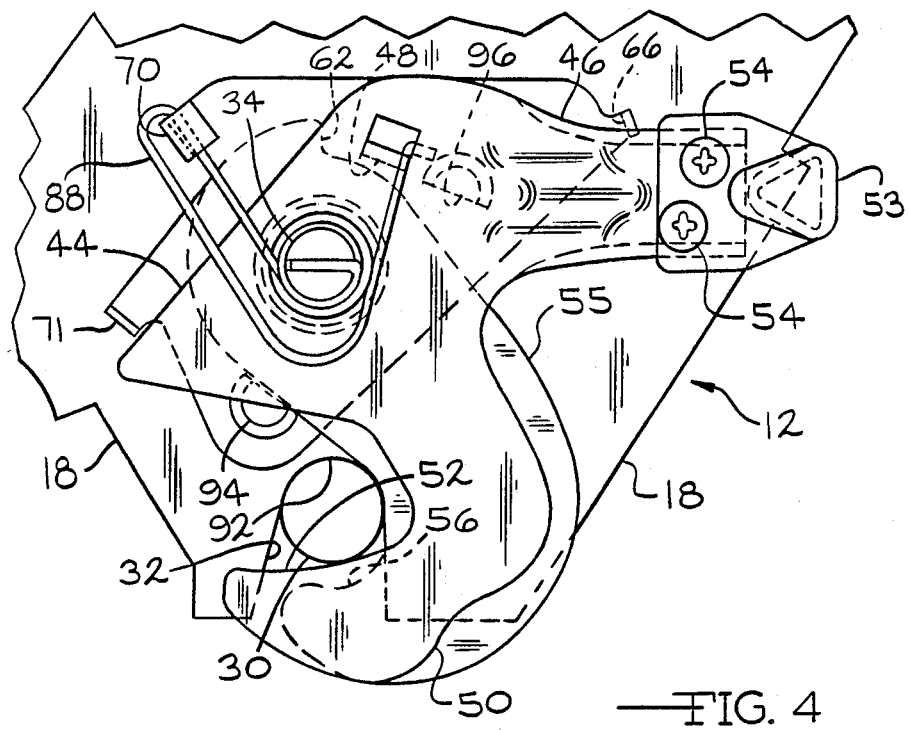
FIG. 4 is a fragmentary side elevational view of a seat pedestal showing the latch in a secured condition about a support shaft.
Figure 5:
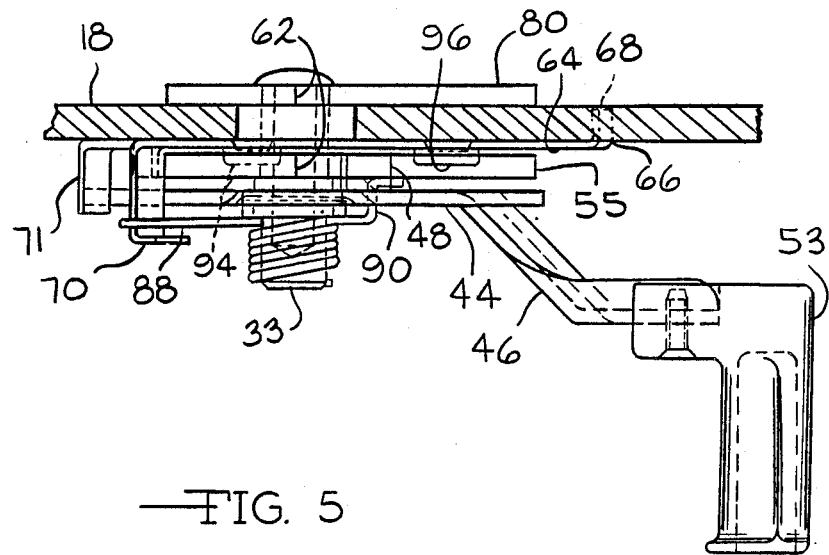
FIG. 5 is a top view of the latch of FIG. 4.

With particular reference to FIGS. 3, 4, and 5, the components of the floor latch 12 are shown in detail. The rearward lower end of the pedestal 18 forms an inverted U-shaped slot 32 which is positioned in registry with the rearward floor support shaft 30 when the bench seat 10 is in the secured position. The latch 12 includes a main pivot 34 having a cylindrical portion 38 forming a threaded hollow end 36, a shoulder 40 and a slotted end 42. A handle bracket 44 is journaled onto the cylindrical portion 38 about bore 45, and is rotatable with respect to the main pivot 34. The handle bracket 44 includes a handle retaining arm 46, a projecting tab 48, and a take-up hook 50 having a shaft engaging notch 52. An actuating handle 53 is attached to the handle retaining arm 46 by screws 54.

A first latching hook 55 is loaded onto cylindrical portion 38 and includes a hook notch 56 and an internal bore with driving surfaces 58 which engage similarly shaped driving surfaces 60 formed on the main pivot cylindrical portion 38. The driving surfaces 58 and 60 cause first latching hook 55 to be rotationally coupled to main pivot 34. The latching hook 55 further includes a radially projecting wall surface 62 which is driven by the handle bracket projecting tab 48 to cause the hook to rotate, as will be explained more completely below.

The main pivot 34 also passes through a modular plate 64 having a projecting locating lug 66 which fits into pedestal locating hole 68 to prevent the plate 64 from rotating relative to the pedestal 18 and further includes a spring engaging arm 70 and a stop tab 71. The latch 12 further includes a bushing 72 and a bushing retainer ring 74. Bushing retainer ring 74 is snapped into bushing groove 76 in the bushing 72 and engages main pivot groove 78 to maintain bushing 72 on the main pivot 34. On the opposite side of pedestal 18 is a second latching hook 80. Second latching hook 80 is identical in configuration to hook 55 and also includes driving surfaces 58, notch 56 and radially projecting wall surface 62. A retainer bolt 82 is threaded into the hollow end 36 of main pivot 34 to retain the above described components in an assembled condition loaded onto the main pivot 34. The entire assembly is freely rotatable with respect to the pedestal 18 except for the modular plate 64.

A handle torsion spring 84 includes an inner end 86 which is received by slotted main pivot end 42, has a radially projecting loop 88 which is looped around the spring engaging arm 70 of modular plate 64, and has a radially projecting end 90 which is inserted into the aperture formed in the handle bracket 44 by projecting tab 48. Torsion spring 84 biases the handle bracket 44 and latching hooks 55 and 80 in the clockwise direction with respect to the orientation of the latch shown in FIGS. 4, 6 and 7.

Referring particularly to FIG. 4, the pedestal 18 is shown in a latched relationship with the rearward support shaft 30. The support shaft 30 is shown engaging the closed upper end 92 of the inverted U-shaped slot 32 in the pedestal 18. The latching hooks 55 and 80 are in the latched position in which the hook notches 56 are positioned below the shaft 30 to entrap the shaft 3 between the seat and the hooks within the slot 32. The latching hooks are biased in this latching position by the spring 84 and held against detent stop 94 projecting from the modular plate 64. The distance between the hook notch 56 and the closed upper end 92 of the slot is purposefully elongated to accommodate variations in the vertical height of the two support shafts 30 relative to one another. The elongated slot however, permits the bench seat 10 to rock, pivoting about the forward support shafts 28.

The take-up hook 50 is used to eliminate the space between the latching hooks and the shaft 30 to prevent rocking of the bench seat. The spring 84 biases the handle bracket 44 and the take-up hook 50 such that the engaging notch 52 is in engagement with the lower side of the shaft 30, the side of the shaft opposite the seat 10. The take-up hook 50, by engaging the bottom side of the shaft 30, will prevent the bench seat from rocking forward during breaking of the vehicle. The spring 84 will bias the handle bracket in a clockwise direction until the take-up hook 50 is in an engaging position in which the take-up hook engages the shaft 30 or the handle bracket 44 engages the stop tab 71 projecting from the modular plate 64.

Figure 6:
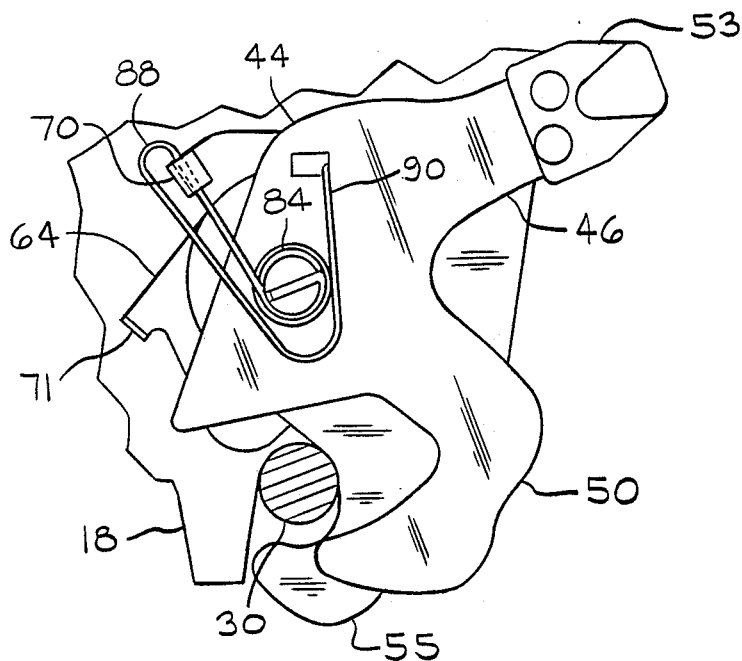
FIG. 6 is a side elevational view like FIG. 4 showing the latch in a partially released position with respect to the support shaft.

In operation to release the latch 12 to remove bench seat 10 from the vehicle, the handle 53 is raised, rotating the handle bracket in a counterclockwise direction as viewed in FIG. 4 in opposition to biasing spring 84. The handle bracket will rotate freely about the main pivot 34 for a predetermined degree of lost rotational motion until the projecting tab 48 engages the radially projecting wall surface 62 of the first latching hook 55. This position of the handle bracket is illustrated in FIG. 6. As a result of rotating the handle bracket, the take-up hook 50 has been moved to a release position out of engagement with the shaft 30.

Figure 7:
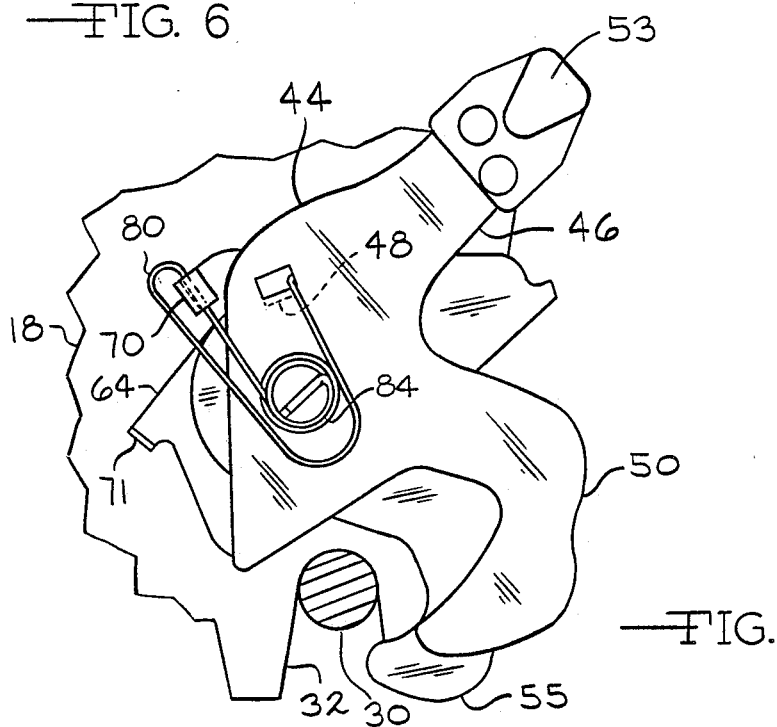
FIG. 7 is a side elevational view showing the latch in a fully released position with respect to the support shaft.

As the handle 53 is further raised from the position shown in FIG. 6, the handle bracket now rotates the first latching hook 55 causing the main pivot 3 to be rotated by the drive surfaces 58 of the hook 55 and corresponding drive surfaces 60 of the main pivot 34. Rotation of the main pivot in turn rotates the second latching hook 80. The handle 53 can be raised until the first latching hook 55 engages the detent stop 96 in the modular plate 64. The fully raised position of the latch hooks, shown in FIG. 7, is a release position in which both the take-up hook 50 and the latching hooks 55 and 80 have cleared the slot 32 to enable the shaft 30 to be removed from the slot 32 by raising the bench seat 10.

In order to couple the bench seat 10 with the vehicle floor, the seat is first positioned so that the forward pedestal slots engage forward support shafts 28 and then the seat is rotated downwardly. The bottom surfaces of the latching hooks 55 and 80 and the take-up hook 50 engage the top surface of the rearward floor shafts 30. As the seat 10 is pushed downwardly on the rear support shafts, the forces acting on the latching hooks and the take-up hooks cause the hooks to rotate in opposition to the biasing spring to move the hooks away from the slot 32. Continued downward movement of the bench seat causes the shaft 30 to be seated into the upper end of the slot 32 enabling the hooks to be rotated in a clockwise direction beneath the shaft 30 to secure the bench seat to the floor.

The latch 12 of this invention includes a take-up mechanism to prevent movement of the seat in a direction away from the support shaft as would occur during vehicle breaking. The take-up mechanism includes a take-up hook which is rotated beneath the support shaft and engages the lower side of the support shaft opposite seat 10 to prevent the bench seat from rocking forward during vehicle braking.

It is to be understood that the invention is not limited to the exact construction illustrated and described above, but that various changes and modifications may be made without departing from the spirit and scope of the invention as defined in the following claims.

What is claimed is:

1. A latch for removably coupling a seat to a vehicle floor structure having a horizontal latching member disposed in said vehicle floor structure, said seat forming a generally vertical slot open at its lower end to enable said seat to be positioned on said latching member with said latching member received in said slot, said latch comprising:
   at least one latch hook rotatably carried by said seat, said latch hook being operable to rotate beneath said latching member to a latched position in which said latch hook substantially closes the open end of said slot to entrap said latching member in said slot to couple said seat to said vehicle structure;
   take-up means operatively associated with said seat and rotatable into a position closing said slot open end and engaging the lower side of said latching member to prevent upward movement of said seat relative to said latching member; and
   bias means operatively associated with said latch hook and said take-up means for rotating said latch hook into said latched position and for moving said take-up means into said engaging position.

2. The latch of claim 1 further comprising:
   a pivot carried by said seat about which said latch hook rotates; and
   wherein said take-up means includes a take-up hook rotatable about said pivot to said position in which said take-up hook engages said latching member lower side.

3. The latch of claim 2 wherein said latch hook and said take-up hook are biased into positioning closing said slot open end when said seat is removed from said vehicle, said hooks being configured so that upon lowering of said seat onto said latching member said hooks engage the upper surface of said latching member and are rotated in opposition to said bias to open said slot for reception of said latching member therein.

4. The latch of claim 2 further comprising a handle bracket carried by said seat and rotatable about said pivot, said handle bracket being operatively coupled with said latch hook and said take-up hook for rotating said hooks in opposition to said biasing means to release positions in which said take-up hook is disengaged from said latching member and no longer closes said slot and said latch hook no longer entraps said latching member in said slot to enable said seat to be removed from said vehicle structure.

5. The latch of claim 4 further comprising means providing for a predetermined degree of lost rotational motion of said handle bracket before said latch hook begins to rotate to its release position, during said lost rotational motion said take-up hook being rotated to said release position.

6. The latch of claim 5 wherein said take-up hook is formed integrally with said handle bracket.

7. A floor latch for removably coupling a seat to a vehicle structure having a latching member comprising:
   a main pivot carried by said seat;
   at least one latch hook carried by said seat and rotatable about said pivot to a latched position wherein said latching member is entrapped by said latch hook to secure said seat to said vehicle structure and said latch hook being rotatable to a release position wherein said latching member is released;
   take-up means carried by said main pivot and rotatable to an engaged position in which said take-up means engages said latching member for preventing movement of said seat relative to said latching member while said seat is coupled to said vehicle structure and said take-up means being rotatable to a release position in which said take-up means is disengaged from said latching member; and
   biasing means operatively associated with said latch hook and said take-up means and exerting a force for both rotating said latch hook into said latched position and for rotating said take-up means into said engaged position.

8. The floor of claim 7 wherein said take-up means includes a handle portion for manually rotating said take-up means from said engaged position to said release position in opposition to said biasing means.

9. The floor latch of claim 8 further comprising means operatively associated with said take-up means and said at least one latch hook for rotating said latch hook to said release position after a predetermined degree of lost rotational motion of said take-up means toward said release position.

10. The floor latch of claim 7 wherein said biasing means includes a spring for rotatably urging said latch hook to said latched position and said take-up means to said engaged position.

11. The floor latch of claim 7 wherein said at least one latch hook comprises two latch hooks rotatably mounted to said seat at said main pivot.

12. The floor latch of claim 7 wherein said latching member is comprised of a shaft affixed to the floor structure of a vehicle.

13. The floor latch of claim 12 wherein said take-up means includes a take-up hook formed integrally with a handle portion and biased by said biasing means into a position in which said take-up hook engages a lower surface of said shaft with said seat being supported upon said shaft.

14. A floor latch for removably coupling a seat to a motor vehicle floor structure, said seat of a type having a pair of laterally separated pedestals with one of said floor latches carried by each of said pedestals, said floor structure having a pair of floor support shafts affixed thereto for engagement with said pedestals, each of said latches comprising:
   a main pivot carried by one of said pedestals and journaled for rotation therewith;

a handle bracket journaled onto said main pivot and having a projecting tab, said handle bracket forming a surface engageable with said floor shaft;

a latch hook carried by said main pivot and coupled thereto for mutual rotation, said latch hook having a notch engageable with one of said floor shafts and further forming a radial wall surface engageable with said handle bracket tab;

an actuation handle coupled to said handle bracket for rotating said handle bracket;

said pedestals each forming an elongated slot closed at one end and open at the other end for reception of said floor shafts therein when said seat is supported upon said support shafts;

biasing means exerting a force for rotating latch hook into a position closing said slot open end so as to entrap one of said floor shafts within said slot to secure said seat to said vehicle floor structure; and a take-up hook carried by said main pivot and rotatable into a position engaging a lower surface of one of said floor shafts to prevent movement of said seat relative to said support shafts, said take-up hook being rotated into said engaged position by said force of said biasing means.

* * * * *